United States Patent
Runge

[11] Patent Number: 6,087,583
[45] Date of Patent: Jul. 11, 2000

[54] MULTIWIRE PARALLEL CONDUCTOR

[75] Inventor: Joachim Runge, Arolsen, Germany

[73] Assignee: Alcatel, Paris, France

[21] Appl. No.: 09/181,391

[22] Filed: Oct. 28, 1998

[30] Foreign Application Priority Data

Nov. 12, 1997 [DE] Germany .............. 197 50 064

[51] Int. Cl.$^7$ ............................. F16L 11/127
[52] U.S. Cl. ............. 174/47; 174/15.1; 174/15.5; 174/15.6
[58] Field of Search .............. 174/47, 70 C, 174/14 R, 15.1, 15.5, 15.6, 15.7, 74 R, DIG. 32

[56] References Cited

U.S. PATENT DOCUMENTS

| | | | |
|---|---|---|---|
| 3,011,082 | 11/1961 | Ahrens . | |
| 3,654,380 | 4/1972 | Tatum et al. | 174/47 |
| 4,323,870 | 4/1982 | Moritz et al. | 336/206 |
| 5,073,679 | 12/1991 | Bencharab et al. | 174/15.5 |
| 5,097,241 | 3/1992 | Smith et al. | 336/60 |
| 5,270,485 | 12/1993 | Jacobsen | 174/15.1 |
| 5,886,434 | 3/1999 | Nygard | 310/61 |

FOREIGN PATENT DOCUMENTS

| | | |
|---|---|---|
| 3 34 993 | 2/1977 | Austria . |
| 19 08 274 | 11/1964 | Germany . |
| 3 13 822 | 6/1956 | Switzerland . |

OTHER PUBLICATIONS

Sequenz, H.: Herstellung der Wicklungen elektrischer Maschinen, Springer–Verlag, Wien, New York, 1973 S. 141–146.

Weh, Herbert: Dimensionierung direkt gekühlter Leiter, insb. fur Turbogeneratoren. In: Conti Elektro Berichte, Jul./Sep. 1959, S. 241.

*Primary Examiner*—Dean A. Reichard
*Assistant Examiner*—W. David Walkenhorst
*Attorney, Agent, or Firm*—Ware, Fressola, Van der Sluys & Adolphson LLP

[57] ABSTRACT

In a windable multiwire parallel conductor (1) that can be used for windings of electrical devices and machines, e.g. for electrical transformers, there is provided a plurality of individually electrically insulated conductive strands (3,11) which are arranged in at least two juxtaposed stacks (5) and are bent in such a way that their position in the stacks (5) is interchanged over the length of the multiwire parallel conductor (1). In the multiwire parallel conductor (1), there is provided at least one tubular strand (11) with a cooling channel (13) for a coolant to directly cool the winding.

15 Claims, 2 Drawing Sheets

MULTIWIRE PARALLEL CONDUCTOR

BACKGROUND OF THE INVENTION

1. Technical Field

The invention relates to a windable multiwire parallel conductor used for windings of electrical devices and machines. The multiwire parallel conductor has several strands that are electrically insulated from each other and arranged as at least two juxtaposed stacks. The strands are bent in such a way that their position in the stacks is reversed over the length of the multiwire parallel conductor.

2. Description of the Related Art

Electrical conductors with a large cross-section for applications as windings of electrical devices and machines, a particular of transformers, are subdivided into a number of strands that are electrically insulated from each other and connected in parallel at their respective ends. These so-called twisted conductors can be quite long and are therefore capable of being wound on a cable reel. They have an approximately rectangular total cross section and are formed from a plurality of solid strands, with each strand having a flat, at least approximately rectangular cross-section and an electrical insulation. The strands are made of copper, aluminum or an alloy thereof. In order to keep the current displacement at a minimum, the position of the strands in the total cross-section of the multiwire parallel conductor can be repeatedly interchanged along the length of the twisted conductor. A suitable tool is used in a continuous manufacturing process to bend the strands at predetermined locations so that the position of the strands in the multiwire parallel conductor changes according to the bends and displacement of the strands. The changes in the position of the individual strands across the cross-section of the multiwire parallel conductor advantageously produces very small eddy current losses. The flat sides of the strands can be bent or offset, for example, around the longitudinal axis of the multiwire parallel conductor, while the order of the strands in the cross-section of the multiwire parallel conductor is maintained over several repeating cycles.

In transformers, but also in other electrical devices and machines, the electrical losses cause a considerable increase in temperature of the multiwire parallel conductors forming the windings. Consequently, the dissipated heat has to be removed from the coiled multiwire parallel conductors through an appropriate coolant. The efficiency of the cooling depends here very much on the thickness of the paper tape wrapping that typically surrounds the solid insulated strands of the multiwire parallel conductors. A thick paper wrapping results in a good electrical insulation of the multiwire parallel conductor. Optimal cooling of the multiwire parallel conductor, however, can only be achieved when any additional electrical insulation of the multiwire parallel conductor is eliminated entirely, i.e. when the multiwire parallel conductors are wound without any wrapping. However, this can be implemented for transformers only on the low voltage side.

Multiwire parallel conductors that have a paper insulation, are conventionally wound by inserting spacer plates between the windings. In this way, one or several oil passageways are formed to improve the cooling of the winding. However, the paper tapes may block the cross-section of the cooling channels, thereby limiting the circulation of the coolant. The low mechanical strength of the paper insulation must also be considered when the winding is manufactured.

EP 0 746 861 B1 describes a multiwire parallel conductor wherein the strands are surrounded by a woven ribbon. The weft threads and/or warp threads of the ribbon are made of polyester or a mixed yarn of glass fiber and polyester. To increase the mechanical strength of the covering, the woven ribbon can be in addition be pre-impregnated with a partially cross-linked epoxy resin.

SUMMARY OF THE INVENTION

It is the object of the invention to provide a multiwire parallel conductor suitable for windings of electrical devices and machines, in particular for electrical transformers, that can be manufactured by a continuous process and wound on a cable reel and that provides a simple, but effective cooling of the winding of the electrical device and the electrical machine, respectively.

This problem is solved by the invention by providing at least one tubular strand with a cooling channel for a coolant.

In one advantageous aspect of the invention, dissipated heat can be carried away immediately from the wound multiwire parallel conductor by way of the at least one tubular strand that includes inside the strand a cooling channel for a coolant. The multiwire parallel conductor of the invention can be used easily and without introducing additional complexity, on the high voltage side of a transformer where typically a common paper insulation with a considerable wall thickness surrounds the insulated the strands of the multiwire parallel conductor to provide adequate insulation. With the direct cooling provided by the multiwire parallel conductor of the invention, the thickness of the paper insulation or of other electrically insulated layers does not cause adverse effects. The conventional means used to cool the winding, for example braids or spacers, can be used only at low voltages, e.g. on the low voltage side of a transformer. Transformers with a high power rating have pumps that continuously circulate a transformer oil to force cooling of the windings. In this case, the cooling channel(s) provided in the strands of the wound multiwire parallel conductor can be connected directly to the existing cooling loop, with the transformer oil supplied through the cooling channels. With this simple method, the multiwire parallel conductors can be cooled directly. When the multiwire parallel conductors are manufactured, the tubular strands are provided with a varnish insulation just like conventional solid strands and can be twisted together with the solid strands in a continuous process so that the multiwire parallel conductor of the invention can be manufactured in a simple and cost-effective manner.

In a simple design of the multiwire parallel conductor requiring few changes, the tubular strand advantageously replaces at least one solid strand.

For the same reason, it is also advantageous if at least one stack of tubular strands is provided. If this stack of tubular strands is arranged between two stacks of solid strands, then the multiwire parallel conductor can be manufactured by a simple process and cost-effectively, without requiring significant changes of the bending tool.

Advantageously, to dissipate heat efficiently and directly cool the multiwire parallel conductor, tubular strands can be used exclusively. Such a multiwire parallel conductor can be easily manufactured.

To reliably insulate the tubular strands electrically from the solid strands and to avoid application of a multilayer varnish insulation on the tubular strand, the tubular strand can advantageously be wrapped with a surface insulator, such as a plastic foil or a paper tape, e.g. paper reinforced with aramide fibers.

For the same reason, the tubular strand can advantageously be wrapped with spun glass fiber threads. To improve the adhesion of the spun wrapping on the tubular strand, the glass fiber wrapping is advantageously impregnated with a varnish.

If the tubular strand is made of copper, then the tubular strand can advantageously be manufactured from a round tube by a pressing and/or drawing operation.

To attain a high mechanical strength of the tubular strand and to reduce the possibility that the tubular strand is deformed during the manufacture of the multiwire parallel conductor, the tubular strand is advantageously made of steel.

In this particular case, the tubular strand is advantageously manufactured by a simple process wherein the strand is formed from a folded or seamlessly welded metal tape.

The tubular strand can advantageously be manufactured in a simple and cost-effective manner by making the strand of a plastic, preferably of a plastic with a high mechanical strength and thermal stability.

The drawings schematically illustrate three embodiments which are described in greater detail in the following description.

DETAILED DESCRIPTION OF THE INVENTION

Figure 1:
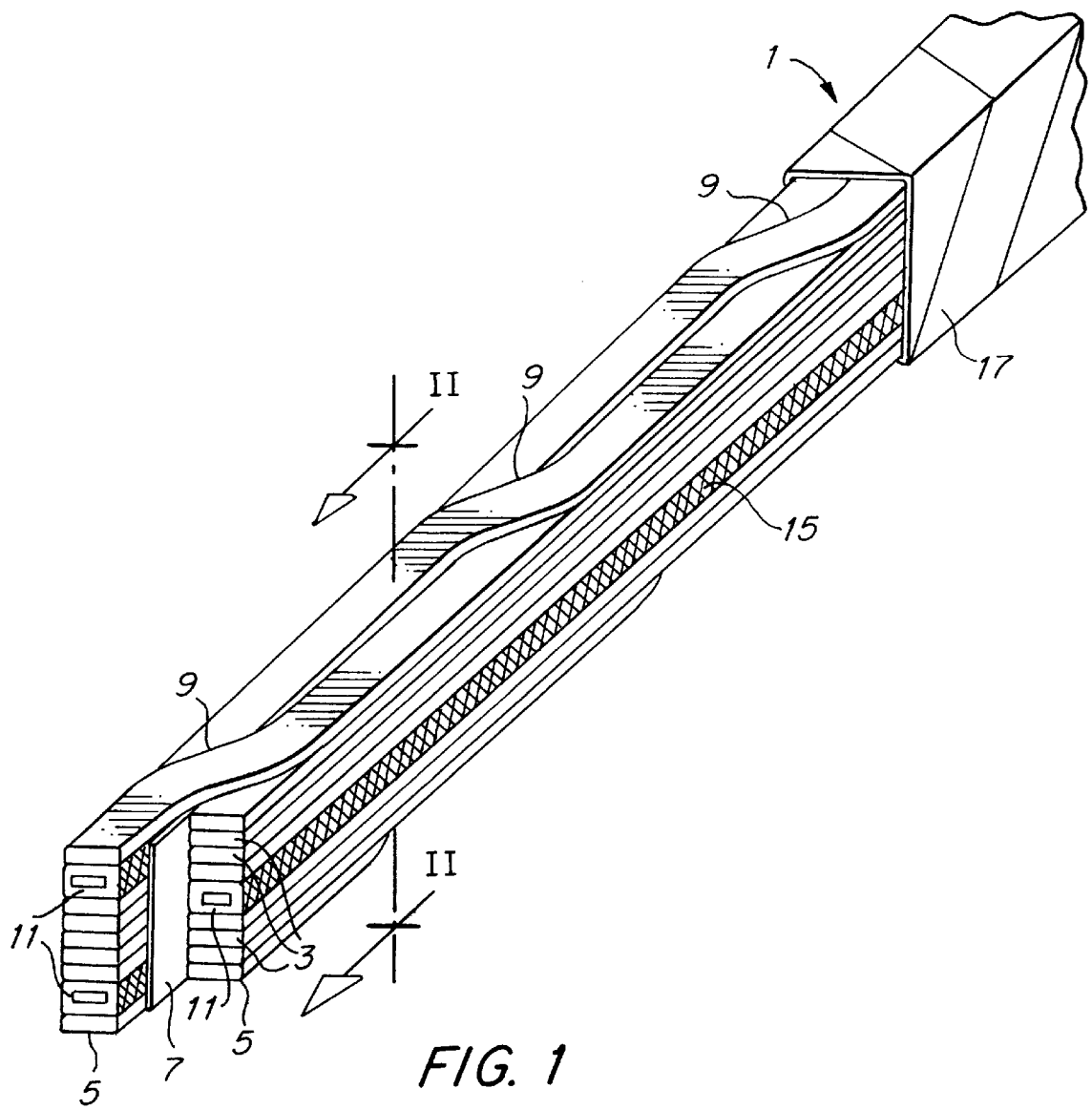
FIG. 1 is a perspective view of a first embodiment of a multiwire parallel conductor according to the invention.
Figure 2:
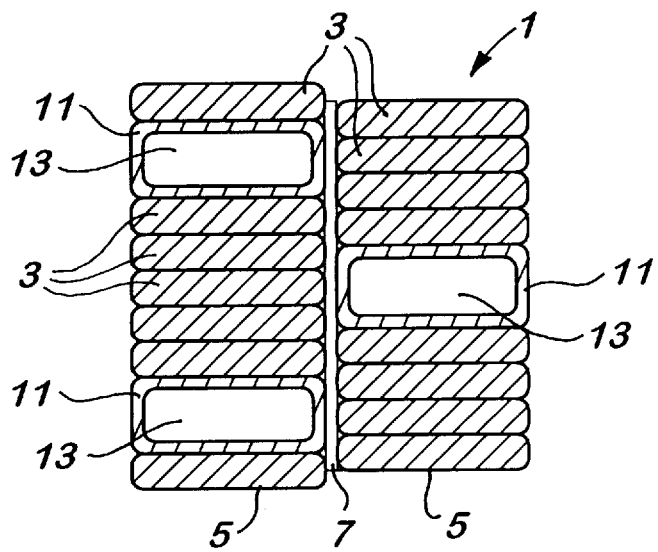
FIG. 2 is a cross-sectional view taken along the line II—II of FIG. 1.

An example of a windable multiwire parallel conductor 1 is illustrated in FIGS. 1 and 2. The multiwire parallel conductor 1 which has a considerable length, is designed in particular to be wound in the form of coils in transformer windings. The multiwire parallel conductor 1 has a large number of flat solid conductive strands 3 with an approximately rectangular cross-section which are arranged, e.g., in two juxtaposed stacks 5. A longitudinal paper tape 7 can be provided between the two stacks 5, as illustrated in the FIGS. 1 and 2. The paper tape 7 forms an intermediate layer between the two stacks 5 and increases the mechanical stability of the multiwire parallel conductor 1. Each of the strands 3 is provided, for example, with its own insulating varnish layer to provide adequate electrical insulation between adjacent strands 3. The mechanical strength of the electrical insulation can be improved by coating the insulating varnish layer of each strand 3 with, e.g., a partially cross-linked epoxy resin. To provide electrical insulation, the surface of the strands 3 that have a high tensile yield strength, can also be wrapped with an insulating material, for example, a suitable plastic foil, a paper tape e.g. made from aramide paper or similar materials, instead of applying the insulating varnish layer. In a continuous manufacture process, the strands 3 are at predetermined distances bent and offset parallel to their flat sides, so that the position of the strands in the cross-section of the multiwire parallel conductor 1 changes regularly over relatively short distances. In FIG. 1, the locations of the bends are indicated with the reference numeral 9.

In this first embodiment, for example, a total of three tubular strands 11 with a rectangular outside shape are arranged within the two strand stacks 5 of the multiwire parallel conductor 1. Each of these tubular strands 11 has a longitudinally extending cooling channel 13 for a coolant and replaces, for example, two superimposed solid strands 3. Like the solid strands 3, the tubular strands 11 are made of copper and can be formed from a round tube by a pressing and/or drawing operation. The tubular strands 11, however, can also be made of steel to provide a higher mechanical strength and dimensional stability. In this case, the tubular strands 11 are advantageously formed from a folded steel tape that is seamlessly welded in the longitudinal direction. The tubular strand 11 can also be made of a plastic with a good mechanical and thermal stability. For example, conventional transformer oil, cooling water or a gas, such as hydrogen, can be used as a coolant.

Conventionally, insulation is applied to solid strands in form of several thin layers of an insulating varnish. This process, however, may be problematic with tubular strands 11. As illustrated in FIG. 1, each of the tubular strands 11 therefore has a spun wrapping 15 of glass fibers, wherein a varnish can be applied thereon to increase the mechanical strength. The tubular strands 11 can also be insulated by applying an insulating varnish or an insulating material to the surface of the strands, such as a plastic foil or a paper in form of a tape, e.g. an aramide paper with a high mechanical yield strength.

A common wrapping 17, for example a wrapping made of paper tape, is applied over the formed twisted bundles of solid strands 3 and tubular strands 11. Alternatively, the common wrapping 17 of the strands 3 and 11 can be made of other thread or tape like materials, e.g. fabric tapes or plastic tapes or threads. The wrapping 17 can also include gaps which is not illustrated in the embodiment of FIGS. 1 and 2.

Figure 3:
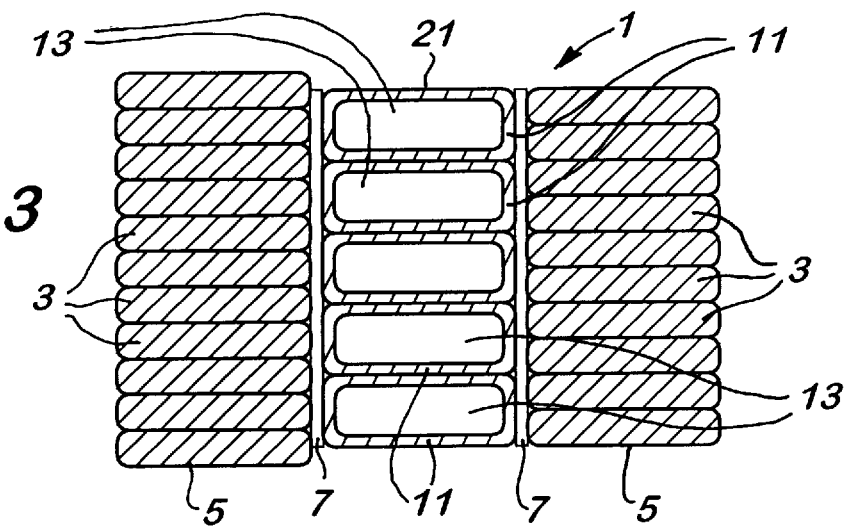
FIG. 3 is a cross-sectional view through a multiwire parallel conductor of the invention according to a second embodiment.

Unlike the first embodiment of FIGS. 1 and 2, the embodiment of a multiwire parallel conductor 1 illustrated in FIG. 3 has two stacks 5 with only solid strands 3 and a stack 21 positioned between the two stacks 5 that has only tubular strands 11. To increase the mechanical strength of the multiwire parallel conductor 1, a respective paper tape 7 is placed between the two stacks 5 formed of the solid strands 3 and the stack 21 formed of the tubular strands 11. This embodiment has the advantage that when the strands are twisted, only the solid strands 3 of the two stacks 5 are bent, changing their position in the total cross section, while the tubular strands 11 maintain their original position in the total cross section. The existing tools used to manufacture the directly cooled multiwire parallel conductors 1 require only small modifications. Otherwise, the multiwire parallel conductor 1 illustrated in FIG. 3 is identical to the multiwire parallel conductor illustrated in FIGS. 1 and 2.

Since the tubular strands 11 typically have a greater height than the solid strands 3, one or several solid strands in the center stack 21 may have to be rearranged to adjust the height of the stack 21 that is formed by the tubular strands 11, to the height of the outer stacks 5 that are formed by the solid strands 3.

Figure 4:
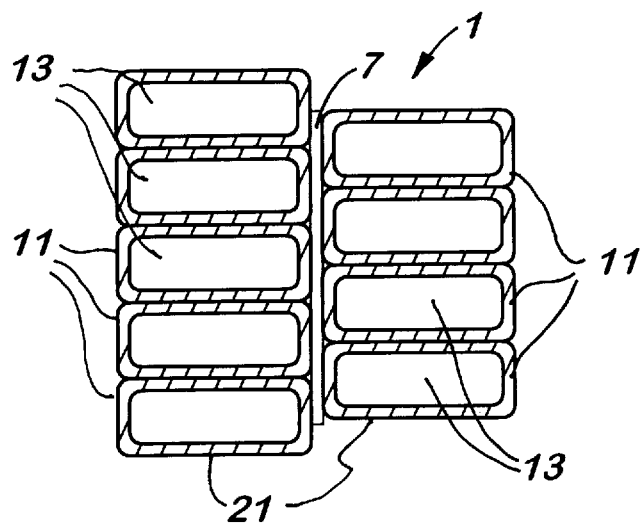
FIG. 4 is a cross-sectional view through a multiwire parallel conductor of the invention according to a third embodiment.

In a modification of the embodiment illustrated in FIG. 3, the multiwire parallel conductor 1 can also be manufactured exclusively from tubular strands 11, so that the multiwire parallel conductor 1 has, for example, one or several stacks of tubular strands 11. Such embodiment is illustrated in FIG. 4. The example of a multiwire parallel conductor 1 illustrated in FIG. 4 includes two stacks 21 of tubular strands 11 having a cooling channel 13 extending in the longitudinal direction. By using only tubular strands 11 of identical height, this multiwire parallel conductor 1 can be manufactured by a particularly simple and cost-effective process and does not require significant changes in the tooling. The third embodiment is otherwise basically identical to the first embodiment illustrated in FIGS. 1 and 2 to which reference is made in order to avoid duplication.

The embodiments described above admirably achieve the objects of the invention. However, it will be appreciated that departures can be made by those skilled in the art without departing from the spirit and scope of the invention which is limited only by the following claims.

What is claimed is:

1. Windable multiwire parallel conductor for use as windings in electrical devices and machines, comprising:

(a) a plurality of individually electrically insulated conductive strands arranged in at least two juxtaposed stacks and each insulated conductive strand is bent in such a way that its position in the stacks changes along the multiwire parallel conductor; and (b) at least one tubular strand comprising a cooling channel for a coolant.

2. Windable multiwire parallel conductor according to claim 1, wherein the at least one tubular strand is in the at least two juxtaposed stacks and each at least one tubular strand is bent in such a way that its position in the stacks changes along the multiwire parallel conductor.

3. Windable multiwire parallel conductor according to claim 1, wherein the at least one tubular strand is at least one stack of tubular strands.

4. Windable multiwire parallel conductor according to claim 1, wherein the plurality of individually electrically insulated conductive strands are tubular strands.

5. Windable multiwire parallel conductor according to claim 4, wherein the at least one tubular strand is in the at least two juxtaposed stacks and each at least one tubular strand is bent in such a way that its position in the stacks changes along the multiwire parallel conductor.

6. Windable multiwire parallel conductor according to claim 1, wherein the at least one tubular strand is provided with a spun wrapping comprising glass yarns.

7. Windable multiwire parallel conductor according to claim 6, wherein the spun glass yarn wrapping is impregnated with a varnish.

8. Windable multiwire parallel conductor according to claim 1, wherein the at least one tubular strand is provided with a wrapping comprising a surface insulating material.

9. Windable multiwire parallel conductor according to claim 1, wherein the at least one tubular strand is made of copper.

10. Windable multiwire parallel conductor according to claim 1, wherein the at least one tubular strand is made of steel.

11. Windable multiwire parallel conductor according to claim 1, wherein the at least one tubular strand is generally rectangular in cross-section and formed from an initially round tube.

12. Windable multiwire parallel conductor according to claim 1, wherein the at least one tubular strand is formed of a folded and seamlessly welded metal tape.

13. Windable multiwire parallel conductor according to claim 1, wherein the at least one tubular strand is made of a plastic.

14. Windable multiwire parallel conductor according to claim 1, wherein the at least two juxtaposed stacks are two outer stacks which juxtapose at least one center stack having the at least one tubular strand.

15. Windable multiwire parallel conductor according to claim 14, wherein the plurality of individually electrically insulated conductive strands in the two outer stacks are solid strands.

* * * * *

UNITED STATES PATENT AND TRADEMARK OFFICE
CERTIFICATE OF CORRECTION

PATENT NO. : 6,087,583
DATED : July 11, 2000
INVENTOR(S) : Joachim Runge

It is certified that error appears in the above-identified patent and that said Letters Patent is hereby corrected as shown below:

Column 3,
Line 47, after "two", -- juxtaposed -- should be inserted.
Line 49, after "two", -- juxtaposed -- should be inserted.
Line 50, after "the" (second occurrence), -- solid conductive -- should be inserted.
Line 53, after "adjacent", -- solid conductive -- should be inserted.
Line 55, after "each", -- solid conductive -- should be inserted.
Line 57, after "the" (second occurrence), -- solid conductive -- should be inserted.
Line 62, after "the", -- solid conductive -- should be inserted.

Column 4,
Line 3, "strand" should be -- juxtaposed --.
Line 6, after "solid", -- conductive -- should be inserted.
Line 7, after "solid", -- conductive -- should be inserted.
Line 31, after "solid", -- conductive -- should be inserted.
Line 32, after "the", -- solid conductive -- should be inserted.
Line 32, after "and", -- tubular strands -- should be inserted.
Line 39, after "two", -- outer -- should be inserted.
Line 39, after "solid", -- conductive -- should be inserted.
Line 40, before "stack", -- center -- should be inserted.
Line 40, after "two", -- outer -- should be inserted.
Line 43, after "two", -- outer -- should be inserted.
Line 44, before "strands" (first occurrence), -- conductive -- should be inserted.
Line 44, after "the" (first occurrence), -- center -- should be inserted.
Line 46, after "solid", -- conductive -- should be inserted.
Line 46, after "two", -- outer -- should be inserted.
Line 56, after "solid" (first occurrence), -- conductive -- should be inserted.
Line 58, after "the" (first occurrence), -- center -- should be inserted.

UNITED STATES PATENT AND TRADEMARK OFFICE
CERTIFICATE OF CORRECTION

PATENT NO.    : 6,087,583
DATED         : July 11, 2000
INVENTOR(S)   : Joachim Runge It is certified that error appears in the above-identified patent and that said Letters Patent is hereby corrected as shown below:

Column 4,
Line 60, after "solid", -- conductive -- should be inserted.

Claims 1-15,
Line 1, "Windable" should be -- A windable --.

Signed and Sealed this

Twenty-first Day of August, 2001

*Attest:*

*Attesting Officer*

NICHOLAS P. GODICI
*Acting Director of the United States Patent and Trademark Office*